United States Patent
Tashiro (10) Patent No.: US 9,045,127 B2
(45) Date of Patent: Jun. 2, 2015

(54) CONTROL DEVICE FOR HYBRID VEHICLE

(75) Inventor: Yutaka Tashiro, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 2 days.

(21) Appl. No.: 13/640,999

(22) PCT Filed: Apr. 26, 2011

(86) PCT No.: PCT/JP2011/060104
§ 371 (c)(1),
(2), (4) Date: Oct. 12, 2012

(87) PCT Pub. No.: WO2011/142245
PCT Pub. Date: Nov. 17, 2011

(65) Prior Publication Data
US 2013/0046429 A1    Feb. 21, 2013

(30) Foreign Application Priority Data
May 12, 2010    (JP) .................................. 2010-109950

(51) Int. Cl.
    *B60L 9/00*         (2006.01)
    *B60W 10/06*       (2006.01)
    (Continued)

(52) U.S. Cl.
    CPC ................ *B60W 10/06* (2013.01); *B60K 6/448* (2013.01); *B60K 6/52* (2013.01); *B60W 10/08* (2013.01); *B60W 20/00* (2013.01);
    (Continued)

(58) Field of Classification Search
    CPC ..... B60W 20/00; B60W 10/08; B60W 10/06; Y02T 10/7005; Y02T 10/7077

USPC .......................... 701/22; 180/65.265; 903/930
See application file for complete search history.

(56) References Cited

U.S. PATENT DOCUMENTS 7,024,859 B2 * 4/2006 Jayabalan et al. ............... 60/716
8,494,701 B2 * 7/2013 Philipp et al. ................... 701/22
(Continued)

FOREIGN PATENT DOCUMENTS

CN     101309810 A    11/2008
EP     1 826 088 A2    8/2007
(Continued)

OTHER PUBLICATIONS

Russian Office Action, Russian Patent Application No. 2012153683 dated Jan. 29, 2014.
(Continued)

*Primary Examiner* — Helal A Algahaim
*Assistant Examiner* — Shardul Patel
(74) *Attorney, Agent, or Firm* — Westerman, Hattori, Daniels & Adrian, LLP (57) ABSTRACT

When an engine (2) is in a stopped state and a vehicle is in a standstill state, a travel control unit (8*a*2) allows the vehicle to travel by a driving force of a rear motor (6) during a period after the brake is released until an acceleration demand determination unit (8*a*1) determines that acceleration is demanded for the vehicle. During the period, a startup speed determination unit (8*a*4) determines a startup travelling speed where the engine (2) is started up on the basis of a load which is estimated by a load estimation unit (8*a*3) on the basis of a current value supplied to the rear motor (6). When the travelling speed of the vehicle is equal to or greater than the startup travelling speed, a startup unit (8*a*5) starts up the engine (2).

5 Claims, 8 Drawing Sheets

(51) Int. Cl.
*B60K 6/448* (2007.10)
*B60K 6/52* (2007.10)
*B60W 10/08* (2006.01)
*B60W 20/00* (2006.01)

(52) U.S. Cl.
CPC ....... *B60W 2530/16* (2013.01); *B60W 2540/10* (2013.01); *Y02T 10/6243* (2013.01); *Y02T 10/6265* (2013.01); *Y02T 10/6286* (2013.01)

(56) References Cited

U.S. PATENT DOCUMENTS

| | | | |
|---|---|---|---|
| 2007/0199745 A1* | 8/2007 | Hayashi | 180/65.2 |
| 2009/0017984 A1* | 1/2009 | Shibata et al. | 477/3 |
| 2010/0056327 A1* | 3/2010 | Hofbauer | 477/5 |
| 2010/0082192 A1* | 4/2010 | Hofbauer | 701/22 |
| 2010/0138089 A1* | 6/2010 | James | 701/22 |
| 2010/0280712 A1* | 11/2010 | Bowman | 701/36 |

FOREIGN PATENT DOCUMENTS

| | | |
|---|---|---|
| JP | 11-103507 A | 4/1999 |
| JP | 2000-038939 A | 2/2000 |
| JP | 2000-341804 A | 12/2000 |
| JP | 2002-081330 A | 3/2002 |
| JP | 3791195 B2 | 6/2006 |
| JP | 2007-230288 A | 9/2007 |
| JP | 2009-154813 A | 7/2009 |
| JP | 2009-290963 A | 12/2009 |
| RU | 2371329 C1 | 10/2009 |

OTHER PUBLICATIONS

Russian Decision on Grant dated Jun. 6, 2014 issued in Russian Patent Application No. 2012153683/11(085305).

Japanese Office Action dated Aug. 5, 2014, issued in counterpart Japanese Patent Application 2012-514755 (3 pages).

Office Action dated Nov. 27, 2014, issued in corresponding Chinese Patent Application No. 201180022200.1, with English Translation (8 pages).

* cited by examiner

SL0  FLAT ROAD (2 PASSENGERS)
BL0  FLAT ROAD (CONSTANT WEIGHT)
SLa  ROAD GRADIENT A (2 PASSENGERS)
BLa  ROAD GRADIENT A (CONSTANT WEIGHT)
SLb  ROAD GRADIENT B (2 PASSENGERS)
BLb  ROAD GRADIENT B (CONSTANT WEIGHT)
SLc  ROAD GRADIENT C (2 PASSENGERS)
BLc  ROAD GRADIENT C (CONSTANT WEIGHT)
SLd  ROAD GRADIENT D (2 PASSENGERS)
BLd  ROAD GRADIENT D (CONSTANT WEIGHT)
SLe  ROAD GRADIENT E (2 PASSENGERS)
BLe  ROAD GRADIENT E (CONSTANT WEIGHT)

CONTROL DEVICE FOR HYBRID VEHICLE

TECHNICAL FIELD

The present invention relates to a control device for a hybrid vehicle provided with an internal combustion engine and an electric motor.

BACKGROUND ART

Hitherto, there has been known a hybrid vehicle provided with an engine (an internal combustion engine) and a motor (an electric motor) as a driving source capable of travelling only by a driving force from the motor when a load acting on the vehicle is low (refer to Patent document 1).

For the hybrid vehicle, there has been proposed an art to obtain the magnitude of a load at the moment of starting up a vehicle in a halting state according to a road gradient, a carrying weight and a load of an air conditioner, and if the load is greater than a predetermined value, a timing for starting up the engine is advanced so as to prevent the driving force from decreasing.

CITATION LIST

Patent Documents

Patent document 1: Japanese Patent No. 3791195

SUMMARY OF INVENTION

Technical Problem

However, in Patent document 1, there is no descriptions on how to advance the startup timing. Moreover, in order to obtain the load, it is necessary to dispose separately special devices for obtaining the road gradient and the carrying weight in the hybrid vehicle.

The present invention has been accomplished in view of the aforementioned problems, and it is therefore an object of the present invention to provide a control device for a hybrid vehicle capable of starting up an internal combustion engine at a timing to prevent a driving force from decreasing according to a load obtained without having a special device disposed separately.

Solution to Problem

The present invention provides a control device for a hybrid vehicle provided with an internal combustion engine and an electric motor as a driving source. The control device of the present invention comprises: an acceleration demand determination unit configured to determine whether or not an acceleration is demanded for the vehicle on the basis of a demanded acceleration; a travel control unit configured to allow the vehicle to travel by a driving force from the electric motor during a period after the braking by a brake device of the vehicle is released until it is determined that an acceleration is demanded for the vehicle by the acceleration demand determination unit when the internal combustion engine is in a stopped state and the vehicle is in a standstill state; a load estimation unit configured to estimate a load acting on the vehicle on the basis of a current value supplied to the electric motor so as to generate the driving force during the period; a startup speed determination unit configured to determine a startup travelling speed where the internal combustion engine is started up on the basis of the load; and a startup unit configured to start up the internal combustion engine when the vehicle reaches or exceeds the startup travelling speed.

According to the present invention, during the period after the braking by the brake device of the vehicle is released until it is determined that an acceleration is demanded for the vehicle by the acceleration demand determination unit when the internal combustion engine is in a stopped state and the vehicle is in a standstill state, the travel control unit allows the vehicle to travel by a driving force from the electric motor. During the period, on the basis of the load estimated by the load estimation unit according to a current value supplied to the electric motor for generating the driving force, the startup speed determination unit determines a startup travelling speed where the internal combustion engine is started up. When the travelling speed of the vehicle equals or exceeds the startup travelling speed, the startup unit starts up the internal combustion engine.

According thereto, it is possible for the hybrid vehicle of the present invention to start up the internal combustion engine at a timing to prevent the driving force from decreasing according to the load obtained from the current value of the electric motor without having a special device disposed separately.

DESCRIPTION OF EMBODIMENTS

Figure 1:
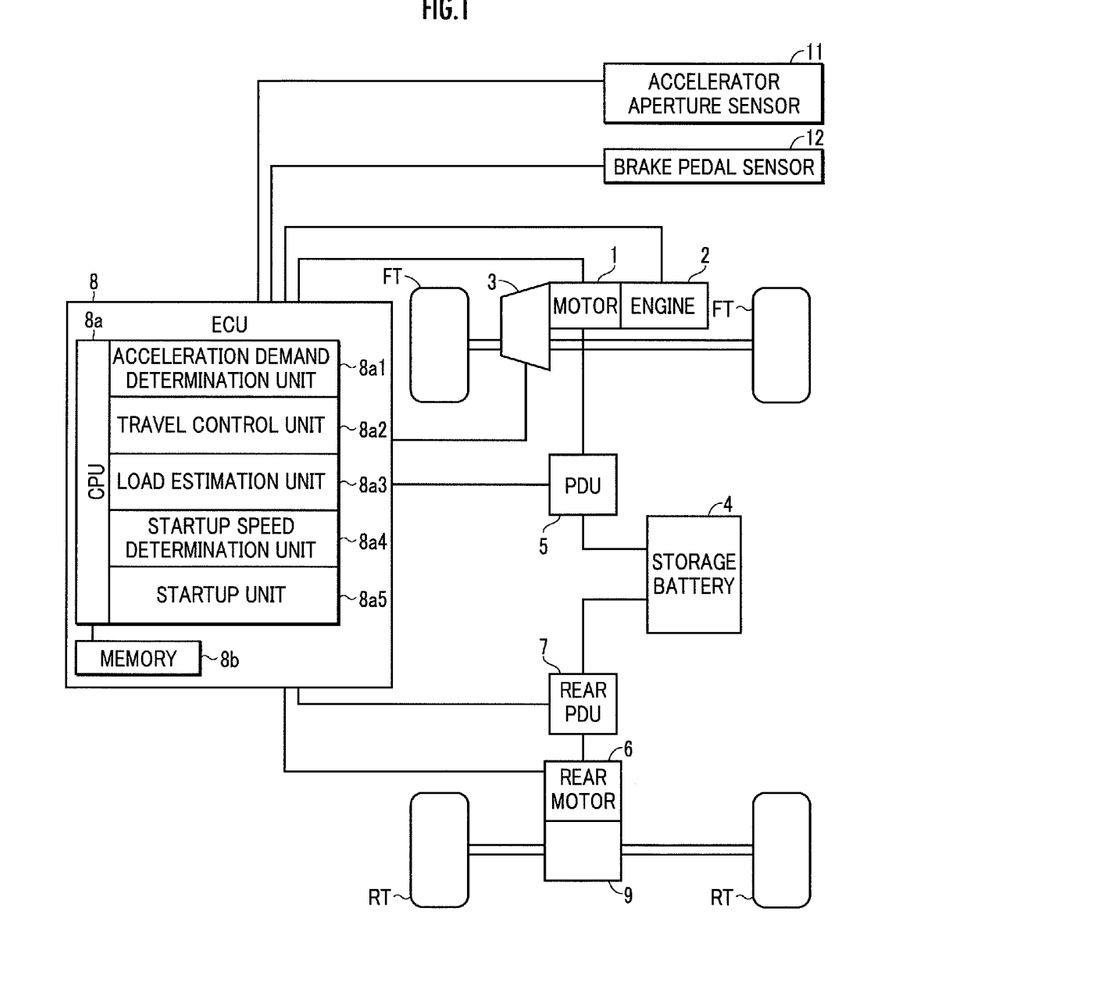
FIG. 1 is a diagram illustrating a schematic configuration of a hybrid vehicle disposed with a control device according to an embodiment of the present invention.

FIG. 1 is a diagram illustrating a schematic configuration of a hybrid vehicle disposed with a control device according to an embodiment of the present invention.

As illustrated in FIG. 1, the hybrid vehicle is provided with an electric motor (a motor) 1 and an internal combustion engine (an engine) 2 for transmitting a driving force (a torque) to the front wheels FT, a continuously variable transmission 3, a storage battery 4 comprised of a secondary battery for transferring power between the motor 1, a power drive unit (PDU) 5 for controlling the motor 1 and the storage battery 4, a rear motor 6 for transmitting a torque to the rear wheels, a rear PDU 7 for controlling the rear motor 6 and the storage battery 4, and an electric control device ECU (Electric Control Unit) 8 for controlling separately the motor 1, the internal combustion engine 2, the continuously variable transmission 3, the PDU 5 and the rear PDU 7.

The ECU 8 is composed of a CPU 8a for performing various arithmetic computation processes and a memorizing device (memory) 8b including a ROM and a RAM for storing various arithmetic computation programs performed by the CPU 8a, various tables, arithmetic computation results and the like, and is configured to input with various electric signals and output to the outside driving signals on the basis of the arithmetic computation results and the like.

In the present embodiment, the CPU 8a of the ECU 8 functions as an acceleration demand determination unit 8a1, a travel control unit 8a2, a load estimation unit 8a3, a startup speed determination unit 8a4 and a startup unit 8a5 in the present invention.

The ECU 8 is supplied with an output signal from an accelerator aperture sensor 11 for detecting a manipulated amount of an accelerator pedal (not drawn) and an output signal from a brake pedal sensor 12 for detecting a manipulated amount of a brake pedal (not drawn).

The ECU 8 determines that the acceleration is demanded for the vehicle on the basis the output signal from the accelerator aperture sensor 11 (hereinafter, referred to as a demanded acceleration). The demanded acceleration equals zero as the acceleration pedal is off and takes a positive value as the acceleration pedal is on. The ECU 8 determines that the acceleration is not demanded as the demanded acceleration is zero and determines that the acceleration is demanded as the demanded acceleration takes a positive value.

As a proof to mistaken operations on the accelerator pedal, it is acceptable that the ECU 8 determines that the acceleration is not demanded if the demanded acceleration is less than a predetermined value and determines that the acceleration is demanded if the demanded acceleration is equal to or greater than the predetermined value. The predetermined value is set at a value by which the mistaken operations can be determined.

As mentioned, the ECU 8 determines whether or not the acceleration is demanded for the vehicle on the basis of the demanded acceleration. The ECU 8 is equivalent to the acceleration demand determined unit.

The ECU 8 determines whether or not the braking by a brake device of the vehicle is released on the basis of the output signal from the brake pedal sensor 12. The output signals from the brake pedal sensor 12 equals zero as the brake pedal is off and takes a positive value as the brake pedal is on. The ECU 8 determines that the braking by the brake device is released as the output signal from the brake pedal sensor 12 changes from a positive value to zero.

The motor 1 is controlled to operate via the PDU 5 on the basis of an instruction signal from the ECU 8. The ECU 8 switches appropriately the PDU 5 between a driving state where the motor is driven by consuming the electric power from the storage battery 4 and a regenerative state where the electric power is generated by restricting a rotation force of a rotor disposed in the motor 1 and the generated power is used to charge the storage battery 4 via the PDU 5.

Similar to the motor 1, the rear motor 6 is controlled to switch appropriately between the driving state and the regenerative state via the rear PDU 7 on the basis of an instruction signal from the ECU 8. The output from the rear motor 6 is transmitted to the rear wheels RT via a rear differential gear 9.

The motor 1 and the rear motor 6 output a torque as they are switched to the driving state by the PDU 5 or the rear PDU 7.

The ECU 8 controls a gear ratio of the continuously variable transmission 3 according to a travelling speed of the vehicle (hereinafter, referred to as a vehicular speed) and a demanded acceleration. When a clutch disposed in the continuously variable transmission 3 is in an engaged state, the output torque from the engine 2 is subjected to a gearshift change by the continuously variable transmission 3 and thereafter transmitted to the front wheels FT. However, either when the clutch is in the engaged state or in a released state, the output torque from the motor 1 is subjected to a gearshift change by the continuously variable transmission 3 and thereafter transmitted to the front wheels FT. By engaging the clutch to the engaged state, the ECU 8 can transmit the combined torque from the motor 1 and the engine 2 to the front wheels FT via the continuously variable transmission 3.

In the present embodiment, a continuously variable transmission is adopted as the transmission; however, it is acceptable to adopt a variable transmission or a dual clutch transmission having 2 input shafts as the transmission.

According to the control by the ECU 8, it is possible for the vehicle to have a front wheel travelling in which the front wheels FT serve as the driving wheels, a rear wheel travelling in which the rear wheels RT serve as the driving wheels, or a four wheel travelling in which the front wheels FT and the rear wheels RT serve as the driving wheels.

There are three travelling ways in the front wheel travelling, including an engine travelling where the front wheels are driven to travel by only the output torque from the engine 2, an EV (Electric Vehicle) travelling where the front wheels are driven to travel by only the output torque from the motor 1, and a HEV (Hybrid Electric Vehicle) travelling where the front wheels are driven to travel by the output torque from the engine 2 which is assisted by the output torque from the motor 1. The rear wheel travelling is a travelling where the rear wheels are driven to travel by only the output torque from the rear motor 6. The four wheel travelling is such a travelling that the front wheels are driven to travel according to any of the travelling ways in the front wheel travelling and the rear wheels are driven to travel according to the rear wheel travelling.

In the engine travelling, the ECU 8 stops the motor 1, switches the engine 2 to the driving state, and engages the clutch to the engaged state. In the EV travelling, the ECU 8 switches the motor 1 to the driving state, stops the engine 2, and releases the clutch to the released state. In the HEV travelling, the ECU 8 switches the motor 1 and the engine 2 to the driving state, and engages the clutch to the engaged state.

Since the motor 1 and the engine 2 are directly coupled, when the engine 2 is stopped, the ECU 8 releases the clutch to the released state and switches the motor 1 to the driving state so as to rotate a crank shaft of the engine 2 by the output torque from the motor 1 to be ignited, it is possible to control the engine 2 to be started up, which is equivalent to the startup unit of the present invention.

When the vehicle is in a standstill state, the ECU 8 starts the vehicle according to the rear wheel travelling. Thereafter, as the vehicular speed arrives at a predetermined speed, as mentioned above, the ECU 8 starts up the engine 2 by using the output torque from the motor 1, engages the clutch to the engaged state to transmit the output torque from the engine 2 to the front wheels FT so as to switch the vehicle to the four wheel travelling. As to be described hereinafter, the predetermined speed is determined on the basis of a load acting on the vehicle and an acceleration demand.

Since the gear ratio of a differential gear (not drawn) or a final gear (not drawn) for the front wheels is fixed, the output revolution speed of the engine 2 is determined according to the vehicular speed and the gear ratio of the continuously variable transmission 3. After the ECU 8 adjusts the output revolution speed of the engine 2 according to the vehicular speed and the gear ratio of the continuously variable transmission 3, the clutch is engaged to the engaged state. The adjustment of the output revolution speed of the engine 2 is performed by the ECU 8 according to the control on the opening degree of a throttle valve (not drawn).

Therefore, after a time interval has elapsed after the engine 2 is started up until the output revolution speed of the engine 2 has been adjusted (hereinafter, referred to as the engine startup time), it is possible to transmit the output torque from the engine 2 to the front wheels FT. The engine startup time is determined preliminarily according to the output revolution speed and is stored in the memory 8b.

During the four wheel travelling, if the vehicular speed exceeds a predetermined speed, the ECU 8 stops the rear motor 6 to switch the vehicle to the front wheel travelling.

When the vehicle is started according to the rear wheel travelling, the ECU 8 accelerates the vehicle by a predetermined acceleration if the vehicular speed is less than a predetermined speed β; if the vehicular speed is equal to or greater than the predetermined speed β, the ECU 8 allows the vehicle to travel uniformly at the speed β. Thus, the ECU 8 controls the vehicular speed according to the control on the revolution speed of the rear motor 6. The control of the vehicular speed is equivalent to the travel control unit of the present invention. As mentioned, the travelling of the vehicle with the revolution speed of the rear motor 6 being controlled by the travel control unit 8a2 at the moment of the startup is called as a creep travelling.

When the vehicle is accelerated by the predetermined acceleration, after a predetermined time has elapsed after the start of the creep travelling, the vehicular speed at which the vehicle is travelling is determined uniquely. Since the gear ratio between the rear wheels RT and the rear motor 6 is fixed, the revolution speed of the rear motor 6 with respect to the vehicular speed is determined uniquely. In other words, if the vehicular speed is less than the predetermined speed β, when the vehicle is accelerated by the predetermined acceleration, the revolution speed of the rear motor 6 is determined uniquely with respect to the time elapsed after the start of the creep travelling.

As above-mentioned, in the creep travelling, if the vehicular speed is less than the predetermined speed β, the vehicle is accelerated by the predetermined acceleration. Thereby, a map in which the revolution speeds at which the rear motor 6 rotates correspond to the seconds elapsed after the start of the creep travelling is stored in the memory 8b. In the creep travelling, the travel control unit 8a2 searches the map with the seconds elapsed after the start of the creep travelling to determine the revolution speed of the rear motor 6, thereby to control the creep travelling.

Even in the case of travelling at the uniform speed, the necessary torque varies according to the road gradient and the carrying weight.

Figure 2:
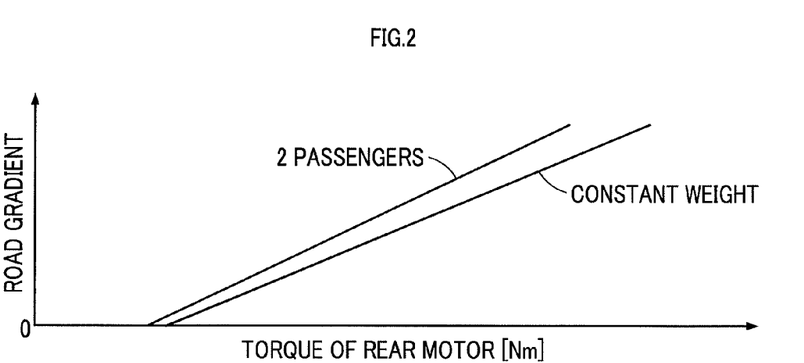
FIG. 2 is a diagram illustrating a correspondence between a torque of a rear motor and a road gradient.

FIG. 2 illustrates a corresponding relationship between the road gradient and the output torque from the rear motor 6. The horizontal axis denotes the output torque (unit: Nm) from the ream motor 6, and the vertical axis denotes the road gradient.

In the case of ascending a road having a greater road gradient, the load becomes greater in comparison with travelling on a flat road (the road gradient is zero), the output torque is increased. FIG. 2 illustrates a case where 2 passengers are boarding on the vehicle (hereinafter, referred to as the 2 passengers) and a case where the maximum number of passengers is boarding on the vehicle and the carrying weight is the maximum (hereinafter, referred to as the constant weight). As illustrated in FIG. 2, since the carrying weight of the vehicle becomes heavier in the case of the constant weight than in the case of the 2 passengers, even when the road gradients are the same, the necessary torque becomes greater. Thus, the necessary torque for the vehicle is increased according to the increment of the road gradient or the carrying weight. In the present embodiment, the road gradient and the carrying weight are referred to as the load on the vehicle.

In the creep travelling, since the vehicular speed is determined according to the revolution speed control with respect the time elapsed from the start of the revolution speed control, if the road gradient and the carrying weight are different, the required output torque from the rear motor 6 will be different. If the current value of the rear motor 6 increases, the output torque from the rear motor 6 will increase. By searching a current value in a map preliminarily stored in the memory 8b with the current value of the rear motor 6 in correspondence to the output torque from the rear motor 6, it is possible to detect the output torque from the rear motor 6. In other words, it is possible to estimate the load according to the current value of the rear motor 6 in the creep travelling.

Figure 3:
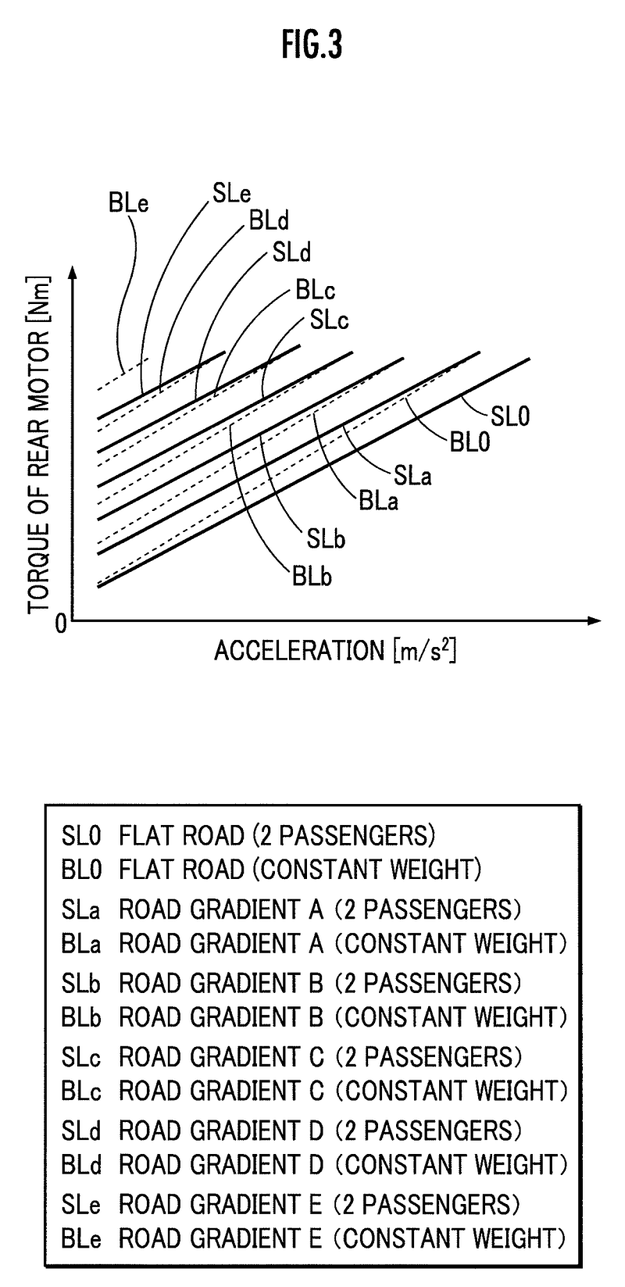
FIG. 3 is a diagram illustrating a relationship of a torque of the rear motor with respect to an acceleration and a load (a road gradient and a carrying weight)

FIG. 3 illustrates a corresponding map of the output torque from the rear motor 6 with respect to the acceleration and the load (the road gradient and the carrying weight). Totally, 12 characteristics, namely 6 types of the road gradients including the flat road and the road gradients of A, B, C, D, and E, and 2 types of the carrying weights including the 2 passengers and the constant weight are listed in the graph. The horizontal axis denotes the acceleration (unit: m/s$^2$) and the vertical axis denotes the output torque (unit: Nm) from the rear motor 6. Herein, the road gradient increases in the order of the flat road, the road gradients A, B, C, D, and E.

In the creep travelling, as above-mentioned, the revolution speed of the rear motor 6 is controlled so as to start the vehicle at the predetermined acceleration. At the moment, the output torque from the rear motor 6 is detected according to the current value of the rear motor 6, and thereafter, it is possible to search the load corresponding to the acceleration and the output torque from the map of FIG. 3. For example, in the map illustrated in FIG. 3, if the intersection point of the acceleration and the output torque is nearby a slant line denoting the road gradient with 2 passengers, it is estimated that the vehicle is travelling on a road having the road gradient and has 2 passengers on board. Thus, when the vehicle is travelling according to the travel control unit 8a2, the load acting on the vehicle is estimated on the basis of the rear motor 6. The estimation of the load is equivalent to the load estimation unit of the present invention.

The map illustrated in FIG. 3 is prepared preliminarily and stored in the memory 8b. The load estimation unit 8a3 estimates the load in accordance with the stored map. In the map of FIG. 3, there are exemplified with 12 characteristics; however, it is acceptable to prepare any number of the characteristics as long as it is sufficiently possible to estimate the load.

In the creep travelling, when the vehicle is being accelerated (when the vehicular speed is less than the predetermined speed β), the driving force is calculated by adding a travel resistance to a product of the vehicle mass multiplied by the acceleration; when the vehicle is travelling at the uniform speed, the driving force is equal to the travel resistance itself. The product obtained by multiplying the driving force by the wheel radius of the rear wheel RT, the gear ratio and a torque transmission efficiency is equal to the output torque from the rear motor 6.

In other words, the necessary driving force in the case of the uniform speed is smaller than the necessary driving force in the case of being accelerated by only a force of the vehicle mass multiplied by the acceleration.

In the case of the creep travelling at the uniform speed (the vehicular speed is equal to or greater than the predetermined speed β), similar to the case of being accelerated, a preliminarily prepared map is stored in the memory 8*b*, the vehicle is controlled according to the map in the creep travelling at the uniform speed.

Hereinafter, the determination of a vehicular speed at which the engine 2 is started up (hereinafter, referred to as the engine startup vehicular speed) will be described.

Figure 4:
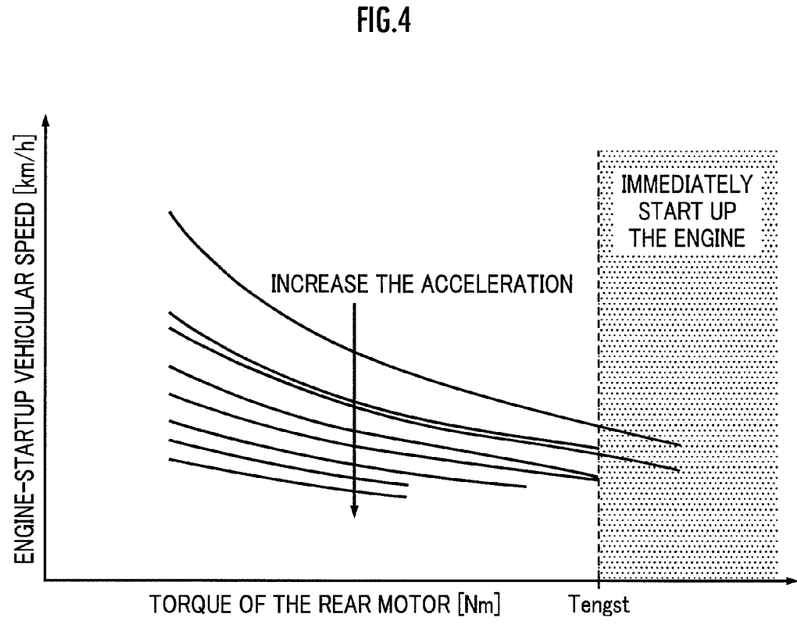
FIG. 4 is a diagram illustrating a relationship of an engine startup vehicular speed with respect to a torque of the rear motor and a demanded acceleration.

FIG. 4 illustrates a map of the engine startup vehicular speed with respect to the output torque from the rear motor 6 and the demanded acceleration. The horizontal axis denotes the output torque (unit: Nm) from the rear motor 6, and the vertical axis denotes the engine startup vehicular speed (unit: km/h).

In FIG. 4, as the output torque from the rear motor 6 increases, in other words approaches to a limit value of the output torque from the rear motor 6, the engine startup vehicular speed decreases. After the output torque from the rear motor 6 exceeds the limit value, the output torque from the rear motor 6 decreases; thereby, the driving force of the vehicle decreases if it is driven by the rear wheels only. Thus, when a greater output torque is demanded from the rear motor 6, by adding the output torque from the engine 2 before the output torque from the rear motor 6 exceeds the limit value, the driving force of the vehicle can be prevented from decreasing.

In FIG. 4, as the demanded acceleration increases, the engine startup vehicular speed decreases. To increase the demanded acceleration means to increase the output torque from the rear motor 6, therefore, by decreasing the engine startup vehicular speed, it is possible to add the output torque from the engine 2 before the output torque from the rear motor 6 exceeds the limit value. Thereby, the driving force of the vehicle can be prevented from decreasing.

When the output torque from the rear motor 6 is equal to or greater than Tengst, since the necessary torque is greater, the engine 2 is started up according to the similar reasons. The map as illustrated in FIG. 4 may be prepared for a forward moving and a reverse moving respectively. For example, Tengst may be set lower in the map for the reverse moving than in the map for the forward moving. The map illustrated in FIG. 4 is prepared preliminarily and is stored in the memory 8*b*.

The ECU 8 determines the engine startup vehicular speed by searching the predetermined acceleration and the output torque from the rear motor 6 in the creep travelling from the characteristic map stored in the memory 8*b* and exemplified in the FIG. 4. The determination of the engine startup vehicular speed is equivalent to the startup speed determination unit of the present invention.

After the acceleration demand is determined by the acceleration demand determination unit 8*a*1 in the creep travelling, it is common that the degree of the acceleration demand (the demanded acceleration) will be changed. For example, the demanded acceleration may be increased gradually. In this case, it is necessary to correct the engine startup vehicular speed according to the changes of the demanded acceleration. After the correction, even if the required output torque increases as the increment of the demanded acceleration, it is possible to add the output torque from the engine 2 before the output torque from the rear motor 6 exceeds the limit value; thereby, the driving force of the vehicle can be prevented from decreasing.

Thus, the ECU 8 determines the engine startup vehicular speed by searching the map of FIG. 4 according to the present demanded acceleration and the output torque from the rear motor 6, and corrects it as the new engine startup vehicular speed. The correction is equivalent to the correction of the startup travelling speed by the startup speed determination unit on the basis of the demanded acceleration in the present invention.

Since the startup speed determination unit 8*a*4 uses the characteristic map exemplified in FIG. 4, it corrects the engine startup vehicular speed to decrease as the demanded acceleration increases. In other words, the correction is equivalent to correcting the startup travelling speed to decrease by the startup speed determination unit as the demanded acceleration increases in the present invention.

As above-mentioned, as the current value of the rear motor 6 increases, the output torque from the rear motor 6 increases. As illustrated in FIG. 4, as the output torque from the rear motor 6 increases, the engine startup vehicular speed decreases. In other words, as the current value of the rear motor 6 increases, the startup speed determination unit 8*a*4 corrects the engine startup vehicular speed to decrease. The correction is equivalent to the correction of the startup travelling speed to decrease by the startup speed determination unit as the current value increases in the present invention.

A plurality of characteristics of the demanded acceleration are exemplified in FIG. 4; however, the number of the characteristics may be set as long as the engine startup vehicular speed can be determined appropriately.

The output torque from the engine 2 can not be transmitted to the front wheels FT unless the engine startup time has elapsed from the startup of the engine 2 driven by the motor 1. After arriving at the limit value of the output torque from the rear motor 6, the output torque from the rear motor 6 decreases. Therefore, if the engine 2 is started up when the output torque from the rear motor 6 is at the limit value, since the output torque from the engine 2 can not be transmitted to the front wheels FT unless the engine startup time has elapsed, the driving force of the vehicle decreases.

As the load acting on the vehicle increases, a travelling speed where the output from the rear motor 6 is maximum (hereinafter, referred to as the maximum-propulsion travelling speed) decreases. Thus, the startup speed determination unit 8*a*4 determines the engine startup vehicular speed on the basis of the maximum-propulsion travelling speed varying in relation to the load and the engine startup time.

Specifically, the engine startup vehicular speed is determined as to be equal to or smaller than a speed obtained by subtracting from the maximum-propulsion travelling speed a product (hereinafter, referred to as the engine startup increasing speed) of the demanded acceleration multiplied by the engine startup time. The engine startup increasing speed denotes a speed which increases from the startup of the engine 2 until when the output torque from the engine 2 is transmittable to the front wheels FT. In other words, by determining the engine startup vehicular speed as to be equal to or less than the speed obtained by subtracting the engine startup increasing speed from the maximum-propulsion travelling speed, the output torque from the engine 2 can be transmitted to the front wheels FT before the decrement of the output torque from the rear motor 6; thereby, it is possible to prevent the driving force of the vehicle from decreasing.

As mentioned, the determination of the engine startup vehicular speed is equivalent to the determination of the startup travelling speed by the startup travelling speed determination unit of the present invention.

Hereinafter, with reference to FIG. 5 and FIG. 6, the timing of output torques from the rear motor 6 and the engine 2 with respect to the vehicular speed will be described.

Figure 5:
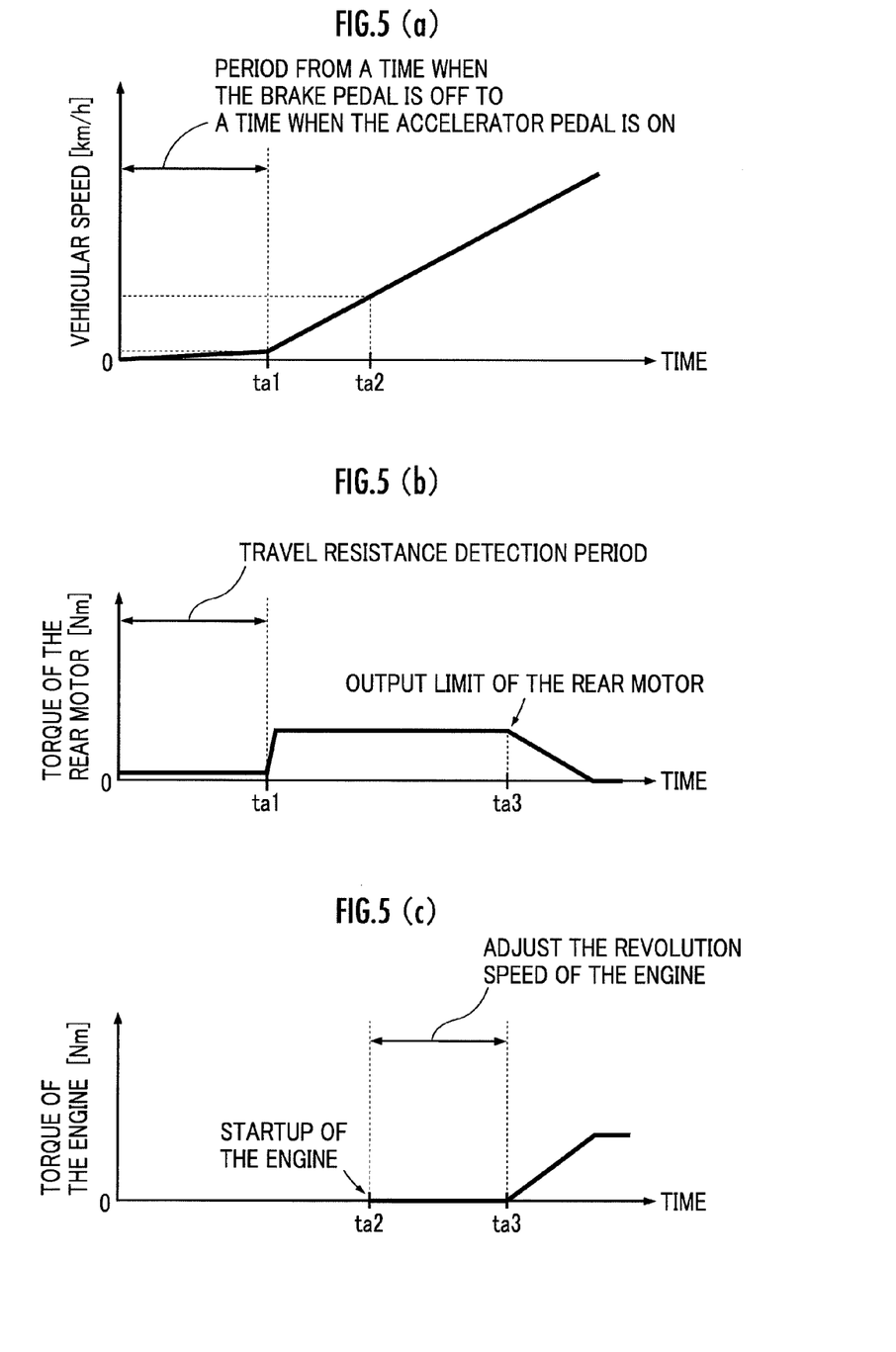
FIG. 5 are diagrams illustrating variations of each parameter with time as an interval for switching the stepping from a brake pedal to an accelerator pedal is short, (a) variation of a vehicular speed with time, (b) variation of an output torque of the rear motor with time, and (c) variation of an output torque of an engine with time.

FIG. 5 are diagrams illustrating variations of each parameter with time as an interval for switching the stepping from the brake pedal to the accelerator pedal is short, FIG. 5(*a*) variation of the vehicular speed with time, FIG. 5(*b*) variation of the output torque of the rear motor 6 with time, and FIG. 5(*c*) variation of the output torque of the engine 2 with time.

The horizontal axis in FIG. 5(*a*) to FIG. 5(*c*) denotes a time (unit: second). The vertical axis in FIG. 5(*a*) denotes a desired vehicular speed (unit: km/h), the vertical axis in FIG. 5(*b*) denotes an output torque from the rear motor 6 (unit: Nm), and the vertical axis in FIG. 5(*c*) denotes an output torque from the engine 2 (unit: Nm).

Zero on the time axis denotes a time where the brake pedal is off, ta1 on the time axis denotes a time where the accelerator pedal is on, ta2 on the time axis denotes a time where the vehicular speed has arrived at the engine startup vehicular speed, and ta3 on the time axis denotes a time where the output torque from the rear motor 6 has arrived at the limit value.

In the period from the time of zero to ta1, the vehicle is in the creep travelling, and the load estimation unit 8*a*3 estimates the load acting on the vehicle on the basis of the current value of the rear motor 6 as mentioned above. After the estimation of the load, the startup speed determination unit 8*a*4 determines the engine startup vehicular speed and starts up the engine 2 as the vehicular speed arrives at the engine startup vehicular speed (at the time of ta2).

In the period from the time of ta2 to ta3, the revolution speed of the engine is adjusted. The period corresponds to the engine startup time. Since the engine startup vehicular speed is determined by the startup speed determination 8*a*4 according to the engine startup time and the estimated load, until the time of ta3 where the motor arrives at the output limit, the output torque of the engine 2 is transmittable.

Figure 6:
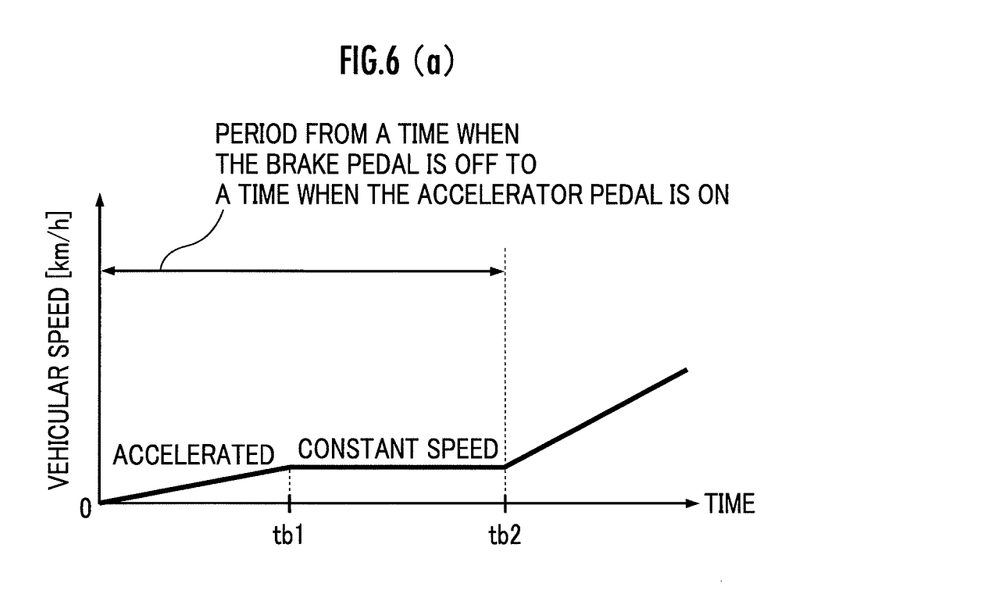
FIG. 6 are diagrams illustrating variations of each parameter with time as an interval for switching the stepping from a brake pedal to an accelerator pedal is long, (a) variation of a vehicular speed with time, and (b) variation of an output torque of the rear motor with time.

FIG. 6 are diagrams illustrating variations of each parameter with time as an interval for switching the stepping from the brake pedal to the accelerator pedal is long, FIG. 6(*a*) variation of a vehicular speed with time, and FIG. 6(*b*) variation of an output torque of the rear motor 6 with time.

The horizontal axis in FIG. 6(*a*) and FIG. 6(*b*) denotes a time (unit: second). The vertical axis in FIG. 6(*a*) denotes a vehicular speed (unit: km/h), and the vertical axis in FIG. 6(*b*) denotes an output torque from the rear motor 6 (unit: Nm).

The time of tb1 on the time axis denotes a time where the creep travelling is switched from the accelerated travelling to the uniform speed travelling, and tb2 on the time axis denotes a time where the accelerator pedal is on. As mentioned above, in the creep travelling, the output torque from the rear motor 6 is smaller in the uniform speed travelling than the accelerated travelling by the amount of force obtained by multiplying the vehicle mass by the acceleration.

Hereinafter, the control process performed by the CPU 8*a* of the ECU 8 according to the present embodiment will be described.

In the present embodiment, the CPU 8*a* of the ECU 8 functions as the acceleration demand determination unit 8*a*1, the travel control unit 8*a*2, the load estimation unit 8*a*3, the startup speed determination unit 8*a*4 and the startup unit 8*a*5.

Figure 7:
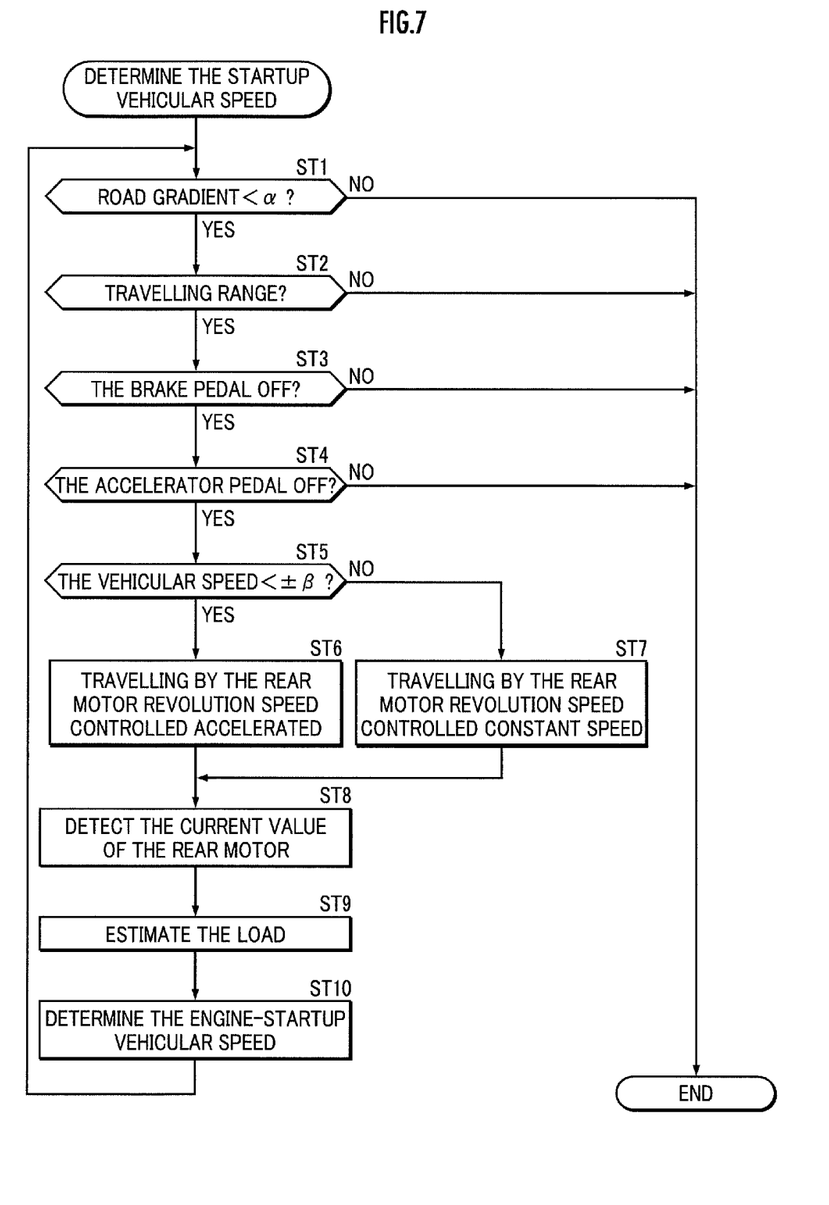
FIG. 7 is a flow chart illustrating a procedure of a control process performed by an ECU 8 in FIG. 1 for determining a vehicular speed for starting up the engine.

FIG. 7 is a flow chart illustrating a procedure of a control process performed by the ECU 8 for determining the engine startup vehicular speed. The program of the control process illustrated by the flow chart is accessed and executed every predetermined time (for example, every 10 msec).

At the first step ST1, whether or not the road gradient is less than a predetermined angle $\alpha$ is determined. The angle of the road gradient is defined as positive as the proceeding direction is an ascending slope. Therefore, in the case of receding, the front direction is a descending slope. As mentioned above, since the road gradient is estimated according to the current value of the rear motor 6 in the creep travelling (step ST9 to be described later), it equals zero at the initial time. The predetermined angle $\alpha$ is set in such a way that the load becomes greater if the angle is equal to or greater than the angle $\alpha$ and thereby the engine should be started up immediately. The angle is stored preliminarily in the memory 8*b*.

If it is determined that the road gradient is less than the predetermined angle $\alpha$ at step ST1 (the determination result of step ST1 is YES), the procedure advances to step ST2 where whether or not a travelling range is selected via a shift lever of the vehicle is determined. The travelling range refers to a range by which the vehicle can travel forward or backward. In the present embodiment, the travelling range refers to a drive gear range, a second gear range or a reverse gear range but not a parking gear range or a neutral gear range.

If it is determined that a travelling range is selected at step ST2 (the determination result of step ST2 is YES), the procedure advances to step ST3 where whether or not the brake pedal is off is determined.

If it is determined that the brake pedal is off at step ST3 (the determination result of step ST3 is YES), the procedure advances to step ST4 where whether or not the accelerator pedal is off is determined.

In step ST2 and step ST3, whether or not a driver of the vehicle is to switch the stepping from the brake pedal to the accelerator pedal so as to move the vehicle forward or backward is determined. If either one of the two determination results is NO, the control process is terminated.

If it is determined that the accelerator pedal is off at step ST4 (the determination result of step ST4 is YES), the procedure advances to step ST5 where whether or not the absolute value of the vehicular speed is less than a speed $\beta$ at which the vehicle is travelling uniformly in the creep travelling. The reason for taking the absolute value is because that the speed is defined as positive when the vehicle is advancing forward, and the speed is defined as negative when the vehicle is receding backward. The processing of step ST4 is equivalent to the acceleration demand determination unit of the present invention.

Figure 8:
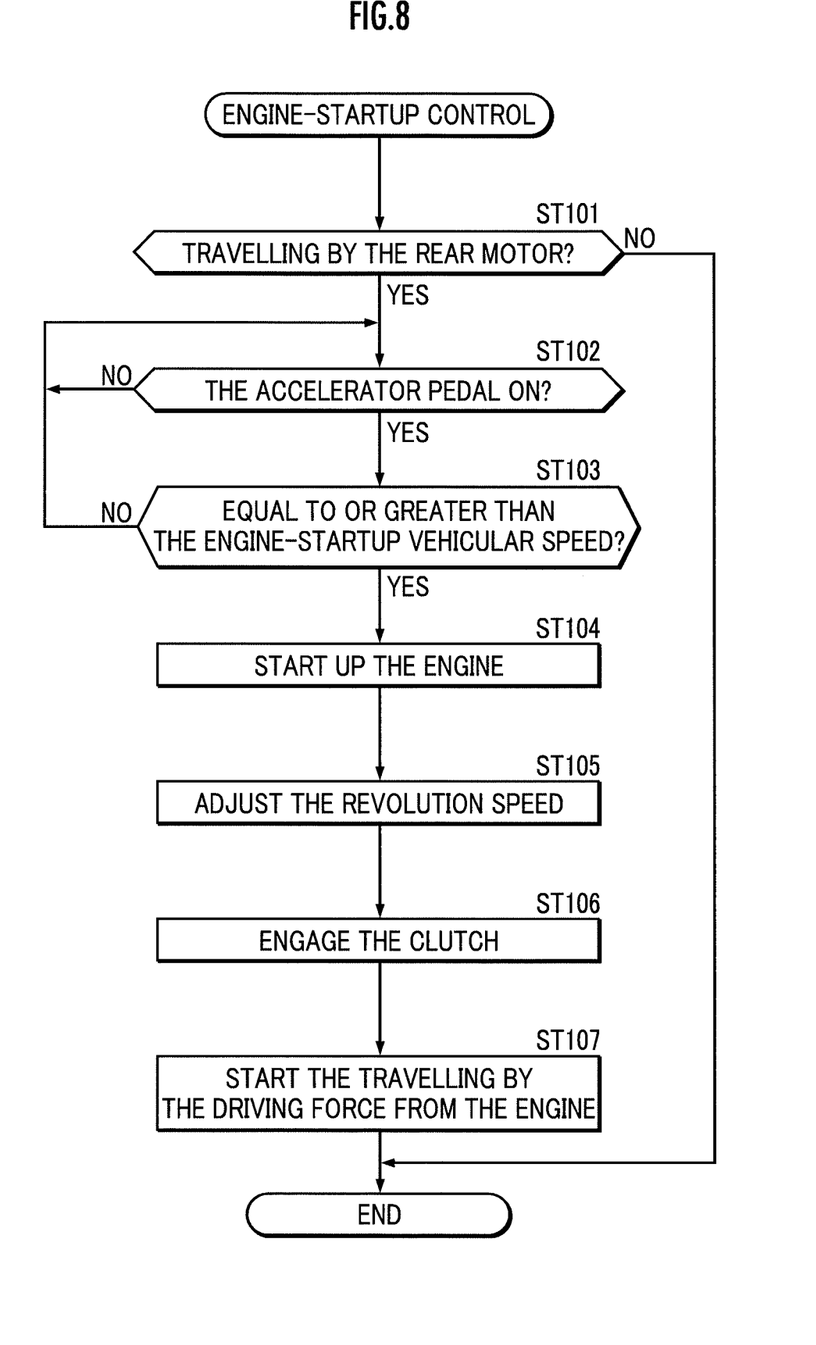
FIG. 8 is a flow chart illustrating a procedure of a control process performed by the ECU 8 in FIG. 1 for starting up the engine.

If it is determined that the road gradient is equal to or greater than the predetermined angle $\alpha$ at step ST1 (the determination result of step ST1 is NO) or the accelerator pedal is on at step ST4 (the determination result of step ST4 is NO), the control process is terminated and a startup control of the engine 2 is performed (the flow chart of FIG. 8).

If it is determined that the absolute value of the vehicular speed is less than the speed $\beta$ at step ST5 (the determination result of step ST5 is YES), the procedure advances to step ST6 where the vehicle is being accelerated in the creep travelling; on the other hand, if it is determined that the absolute value of the vehicular speed is equal to or greater than the speed $\beta$ at step ST5 (the determination result of step ST5 is NO), the procedure advances to step ST7 where the vehicle is travelling uniformly in the creep travelling.

In the period after the determination result of step ST3 is YES until the determination result of step ST4 is NO, the travelling according to step ST6 or step ST7 is equivalent to the travel control unit of the present invention.

After the process of step ST6 or step 7 is finished, the procedure advances to step ST8 where the current value of the rear motor 6 is detected, and thereafter, the procedure advances to step ST9 where the load is estimated from the road gradient and the carrying weight according to the map of FIG. 3 stored in the memory 8b. The processing at step ST8 and ST9 is equivalent to the load estimation unit of the present invention.

After the process of step ST9 is finished, the procedure advances to step ST10 where the engine startup vehicular speed is determined as mentioned in the above. The processing at step ST10 is equivalent to the startup speed determination unit of the present invention.

It will cost some time to switch from the brake pedal to the accelerator pedal even though the driver operates very fast. Therefore, the step ST10 of FIG. 7 will not be performed only when the determination result of step ST2 or step ST3 is NO; when the engine 2 is to be started up, the engine startup vehicular speed is determined according to the process of step ST10.

After the process of step ST10 is finished, the process of step ST1 is performed once more.

FIG. 8 is a flow chart illustrating a procedure of an engine startup control process of the present invention performed by the CPU 8a. As mentioned above, the flow chart is performed when the determination result of step ST1 or ST4 of FIG. 7 is NO. Therefore, the flow chart is performed when the driver of the vehicle switches the stepping from the brake pedal to the accelerator pedal so as to move the vehicle forward or backward.

At the first step ST101, whether or not the travelling is driven by the rear motor 6 is determined. If it is determined that the travelling is not driven by the rear motor 6 at step ST101 (the determination result of step ST101 is NO), the control process is terminated; if it is determined that the travelling is driven by the rear motor 6 at step ST101 (the determination result of step ST101 is YES), the procedure advances to step ST102.

At step ST102, whether or not the accelerator pedal is on is determined. If it is determined that the accelerator pedal is off at step ST102 (the determination result of step ST102 is NO), the determination of step ST102 is performed again; if it is determined that the accelerator pedal is on at step ST102 (the determination result of step ST102 is YES), the procedure advances to step ST103. In other words, the procedure advances to step ST103 only when the accelerator pedal is on.

At step ST103, whether or not the current vehicular speed is equal to or greater than the engine startup vehicular speed determined by the process of step ST10 is determined. If it is determined that the current vehicular speed is less than the engine startup vehicular speed at step ST103 (the determination result of step ST103 is NO), the procedure moves back to step ST102; if it is determined that the current vehicular speed is equal to or greater than the engine startup vehicular speed at step ST103 (the determination result of step ST103 is YES), the procedure advances to step ST104.

At step ST104, as mentioned above, the engine 2 is rotated by the output torque from the motor 1 to be ignited so as to start up the engine 2, at step ST105 the output revolution speed of the engine 2 is adjusted, and at step ST106 the clutch is engaged to the engaged state. The process from step ST104 to step ST106 is equivalent to the startup unit of the present invention.

After the process of step ST106 is finished, the procedure advances to step ST107, the travelling is started by the driving force from the engine 2.

As mentioned above, when the vehicle is moving forward or backward (step ST2, ST3), in the period after the braking by the brake device is released (step ST3) until the acceleration demand is determined (step ST4), the vehicle travels according to the creep travelling (step ST6, ST7). The load is estimated according to the current value of the rear motor 6 at the moment so as to determine the engine startup vehicular speed (step ST8, ST9, ST10).

After the vehicular speed of the vehicle becomes equal to or greater than the engine startup vehicular speed (step ST103), the engine 2 is started up (steps ST104 to ST106) to start the travelling by the driving force from the engine 2 (step ST107).

Therefore, it is possible to start up the internal combustion engine at a timing to prevent the driving force from decreasing according to a load obtained without having a special device disposed separately.

In the present embodiment, the rear motor 6 is mounted as the electric motor of the present invention to drive the vehicle to perform the creep travelling; however, it is acceptable that the vehicle does not have the rear motor 6. For example, the creep travelling is performed according to the motor 1 and the load is estimated according to the current value of the motor 1 at the moment so as to determine the engine startup vehicular speed. In this case, the motor 1 is equivalent to the electric motor of the present invention.

Thus, the present invention can be implemented if it is configured to be able to estimate the load according to the current value of the electric motor outputting the driving force in the creep travelling at the startup so as to determine the engine startup vehicular speed.

In the present invention, it is preferable that the startup speed determination unit obtains a time interval after the internal combustion engine is started up until the driving force from the internal combustion engine is controllable and a maximum-propulsion travelling speed where the driving force output from the electric motor is maximum according to the load acting on the vehicle when the vehicle is travelling by only the driving force from the internal combustion engine, and the startup travelling speed is so determined as to be equal to or smaller than a speed obtained by subtracting from the maximum-propulsion travelling speed a product of the demanded acceleration multiplied by the time interval.

According thereto, the startup speed determination unit obtains a time interval after the internal combustion engine is started up until the driving force from the internal combustion engine is controllable and a maximum-propulsion travelling speed where the driving force output from the electric motor is maximum according to the load acting on the vehicle when the vehicle is travelling by only the driving force from the internal combustion engine.

Thereafter, the startup speed determination unit determines the startup travelling speed in such a way that it is equal to or smaller than a speed obtained by subtracting from the maximum-propulsion travelling speed the product obtained by multiplying an acceleration of the vehicle determined according to the demanded acceleration by the time interval, namely a speed increasing in the time interval after the internal combustion engine is started up until the driving force from the internal combustion engine is controllable.

Therefore, as the travelling speed of the vehicle is equal to or greater than the determined startup travelling speed, the internal combustion engine is started up to prevent the driving force obtained according to the load from decreasing, it is possible for the vehicle to travel by the driving force from the internal combustion engine without unpleasant feelings.

In the present invention, it is preferable that the startup speed determination unit corrects the startup travelling speed by decreasing the startup travelling speed as the current value increases.

According thereto, the startup travelling speed is corrected to decrease as the current value increases, namely the driving force from the electric motor increases. Thereby, at a moment where the driving force of the electric motor is needed (for example, at the moment of a high load), it is possible to advance the timing to start up the internal combustion engine so as to prevent the driving force from decreasing.

In the present invention, it is preferable that the startup speed determination unit corrects the startup travelling speed on the basis of the demanded acceleration. According thereto, the startup travelling speed is corrected on the basis of the demanded acceleration, thus, it is possible to start up the internal combustion engine at the timing to prevent the driving force from decreasing.

In the present invention, it is preferable that the startup speed determination unit corrects the startup travelling speed by decreasing the startup travelling speed as the demanded acceleration increases.

According thereto, the startup travelling speed is corrected to decrease as the demanded acceleration increases. Thereby, when the driving force is being increased for acceleration, it is possible for the internal combustion engine to be started up at an advanced timing so as to prevent the driving force from decreasing.

INDUSTRIAL APPLICABILITY

As above-mentioned, since the present invention can prevent the driving force of a hybrid vehicle provided with an electric motor and an internal combustion engine as a driving source from decreasing when switching from a creep travelling driven by the electric motor to a travelling driven by the internal combustion engine, it is possible to improve the drivability for a driver of the vehicle.

The invention claimed is:

1. A control device for a hybrid vehicle provided with an internal combustion engine and an electric motor as a driving source, comprising:
    an acceleration demand determination unit configured to determine whether or not an acceleration is demanded for the vehicle on the basis of a demanded acceleration;
    a travel control unit configured to allow the vehicle to travel by a driving force from the electric motor during a period after a braking whereby a brake device of the vehicle is released until it is determined that the acceleration is demanded for the vehicle by the acceleration demand determination unit when the internal combustion engine is in a stopped state and the vehicle is in a standstill state, wherein the acceleration demand determination unit determines that the acceleration is demanded for the vehicle when an accelerator pedal is turned ON;
    a load estimation unit configured to estimate a load acting on the vehicle based on a current value supplied to the electric motor so as to generate the driving force during the period, wherein the load acting on the vehicle includes a road gradient and a carrying weight of the vehicle;
    a startup speed determination unit configured to determine, based on the load estimated by the load estimation unit, a startup travelling speed at which the internal combustion engine is started up; and
    a startup unit configured to start up the internal combustion engine when the vehicle reaches or exceeds the startup travelling speed.

2. The control device for the hybrid vehicle according to claim 1, wherein the startup speed determination unit is configured to obtain a time interval after the internal combustion engine is started up until the driving force from the internal combustion engine is controllable, and a maximum-propulsion travelling speed where the driving force output by the electric motor is maximum according to the load acting on the vehicle when the vehicle is travelling by only the driving force from the internal combustion engine, and wherein the startup travelling speed is so determined as to be equal to or smaller than a speed obtained by subtracting from the maximum-propulsion travelling speed a product of the demanded acceleration multiplied by the time interval.

3. The control device for the hybrid vehicle according to claim 1, wherein the startup speed determination unit is configured to correct the startup travelling speed by decreasing the startup travelling speed as the current value increases.

4. The control device for the hybrid vehicle according to claim 1, wherein the startup speed determination unit is configured to correct the startup travelling speed based on the demanded acceleration.

5. The control device for the hybrid vehicle according to claim 4, wherein the startup speed determination unit is configured to correct the startup travelling speed by decreasing the startup travelling speed as the demanded acceleration increases.

* * * * *